United States Patent [19]

Savary

[11] Patent Number: 4,753,769

[45] Date of Patent: Jun. 28, 1988

[54] DEVICE AND METHOD FOR RETAINING A LINEARLY MOVABLE ELEMENT IN A NUCLEAR REACTOR

[75] Inventor: Fernand Savary, Saint Leu La Foret, France

[73] Assignee: Framatome, Courbevoie, France

[21] Appl. No.: 813,332

[22] Filed: Dec. 26, 1985

[30] Foreign Application Priority Data

Dec. 28, 1984 [FR] France ............................... 84 20030

[51] Int. Cl.⁴ .............................................. G21C 7/12
[52] U.S. Cl. ..................................... 376/235; 376/233
[58] Field of Search ....................... 376/233, 235, 263; 92/15, 18, 19, 25, 26, 27, 28

[56] References Cited

U.S. PATENT DOCUMENTS

| | | | |
|---|---|---|---|
| 3,050,943 | 8/1962 | Thorel et al. | 92/18 |
| 3,251,278 | 5/1966 | Royster | 92/18 |
| 3,572,161 | 3/1971 | Lichtenberger et al. | 376/235 |
| 3,580,805 | 5/1971 | Handel | 376/235 |
| 3,902,963 | 9/1975 | Bertone et al. | |
| 3,941,653 | 3/1976 | Thorp | 376/235 |
| 4,544,521 | 10/1985 | Millot et al. | 376/209 |

Primary Examiner—Deborah L. Kyle
Assistant Examiner—Richard L. Klein
Attorney, Agent, or Firm—Pollock, Vande Sande & Priddy

[57] ABSTRACT

Device and method for retaining a linearly movable element in a nuclear reactor. The device comprises, for each shaft, a base fixed to the top part of the reactor internals and coaxial with a shaft guide tube; several grippers or catches spaced apart about the axis of the base and mounted for pivotal movement about a horizontal axis towards a position into and out of engagement with a portion, having circumferential grooves, of the shaft contained in the tube; a slide movable axially on the base towards a top position where it causes engagement of the catches in a groove of the rod, and out of such position; and springs bearing on the base and tending to engage the catches on the shaft. The slide is dimensioned so as to be held by the corresponding sleeve projecting through the reactor vessel cover in a position sufficiently distant from the low position for the catches to be released, whatever the temperature in the reactor.

5 Claims, 3 Drawing Sheets

DEVICE AND METHOD FOR RETAINING A LINEARLY MOVABLE ELEMENT IN A NUCLEAR REACTOR

FIELD OF THE INVENTION

The invention relates to devices and methods to safely retain in place a linearly movable element, typically a drive shaft of a control cluster, in the upper internals of a nuclear reactor.

BACKGROUND OF THE INVENTION

Light water cooled and moderated reactors, and particularly PWRs, are generally provided with clusters of neutron absorbing rods, for controlling operation of the reactor. Each cluster is arranged for being securely connected to a drive shaft extending upwardly from the cluster. The drive shaft is associated with a drive mechanism suitable for linearly moving the shaft, whereby the cluster may be introduced into the core by an adjustable amount and removed from the core. The drive mechanism is typically placed above the cover of the pressure vessel of the reactor and is associated with a stationary sleeve projecting through the cover and accomodating the drive shaft, which is connected to the cluster by a disconnectable coupling.

In most PRWs, the vessel contains a stationary structure for supporting and holding the core and for guiding the clusters and their drive shafts. The latter function is fulfilled by an assembly belonging to the reactor structure, placed above the core and usually called "upper internals". The upper internals constitute a rigid structure comprising a guide tube for each cluster, each guide tube being in alignment with one of sleeves.

It is periodically necessary to replace some of the fuel assemblies or to change their location in the core. For that purpose, the control clusters (that designation including possible spectrum shift clusters) are lowered into the core by actuation of their drive shafts. The vessel cover is removed for providing access to the upper internals. Each drive shaft is separated from the corresponding cluster using an axially introduced remote control tool. Then the upper internals can be raised along with the drive shafts and provide access to the fuel assemblies.

DESCRIPTION OF THE PRIOR ART

Up to now, the drive shafts were arranged for bearing on stop means formed in the bottom portion of the upper internals for being retained by the upper internals during removal of the latter. That approach relies for proper operation on satisfactory alignment of the clusters with respect to the drive shafts. However, it will not be possible to achieve sufficient accuracy of alignment in the reactors presently under development. There is a considerable risk that, in such reactors, the expected misalignments of the control clusters with respect to the cluster guides in the internals may cause jamming of the drive shafts on the upper "pommels" of the clusters provided for connection with the drive shaft gripping means.

SUMMARY OF THE INVENTION

It is an object of the invention to provide a retaining device for locking the drive shaft of a control cluster which is improved with respect to prior art devices having the same purpose. It is a more specific object to provide a device which makes it possible to achieve safe locking of the drive shafts on the higher part of the upper internals when the cover of the reactor should be removed after the temperature which prevails in the reactor has dropped from the value in operation (typically about 320° C.) to a value lower than the boiling point of water (typicaly lower than 90° C.).

For that purpose, the invention provides a device for retaining a linearly movable drive shaft comprising: a base member fixedly secured to the upper portion of the upper internals and coaxial with a guide tube; a plurality of grippers spaced apart and distributed about the axis of said base member and mounted for pivotal movement about a horizontal axis between a position of engagement with a portion, formed with circumferential grooves, of said drive shaft contained in the guide tube, and a released position free from engagement with said drive shaft; slide means axially movable with respect to said base member between a higher position and a lower position, said slide means being operatively connected to said grippers for causing engagement of said grippers into a groove of said drive shaft when in said upper position; resilient means arranged to exert a force on said grippers tending to engage said grippers into said shaft; said slide means being dimensioned for being held by the corresponding sleeve at a position sufficiently remote from its upper position for maintaining the grippers in a released position whatever the temperature prevailing in the reactor and consequently whatever the variations of relative position of the sleeve and the upper internals due to differential thermal expension.

In a preferred embodiment, the resilient means comprise three springs compressed between the base member and the slide means, distributed about the axis and circumferentially located between said grippers. Each gripper may be in the form of a bell crank lever, having one arm formed with at least one latching tooth and another arm having a terminal ball emprisoned in the slide means.

According to another aspect of the invention, a method for retaining a vertically linearly movable shaft includes the steps of engaging the grippers of the device on the drive shaft following removal of the cover; lowering a remotely controlled tool on the drive shaft for locking the shaft in a predetermined position in which the shaft is entirely within the internals; forcing down the slide means with the tool for releasing the grippers at the same time as the drive shaft is seized by the tool; raising the drive shaft to the appropriate locking level; and releasing the slide means for allowing the grippers to engage into the drive shaft before the drive shaft is released by the tool.

BRIEF DESCRIPTION OF THE DRAWINGS

The invention will be better understood from the following description of a particular embodiment, given by way of example with reference to the accompanying drawings, in which.

DESCRIPTION OF PREFERRED EMBODIMENT

Figure 1:
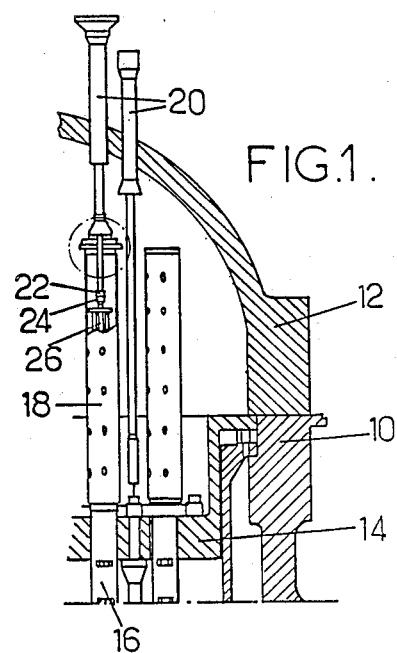
FIG. 1 is a diagrammatic view showing part of the upper internals of a PWR in elevation, and part of the vessel and cover which contain the in axial section.

In FIG. 1, part of a nuclear reactor is illustrated diagrammatically. The reactor has a pressure vessel 10, a cover 12 for closing the vessel and upper internals in vessel 10. The upper internals comprise a plate 14, guide tubes 16 extending down as far as to an upper core plate (not shown) and guide tubes 18 projecting above plate 14 and all ending substantially at the same level, below the cover. A sleeve 20 is located in alignment with each guide tube 18 and is arranged for guiding a corresponding drive shaft 22. That part of each sleeve 20 which is above the cover includes a linear motion mechanism which may be of any one of the well known types, for instance as described in U.S. Pat. No. 3,480,807 (Downs et al). Each drive shaft has a terminal coupling for disconnectable connection between the drive shaft 22 and the pommel 24 of a corresponding control cluster 26.

The arrangement which has been described up to now is well known in the art and consequently does not require a detailed description.

Figure 2:
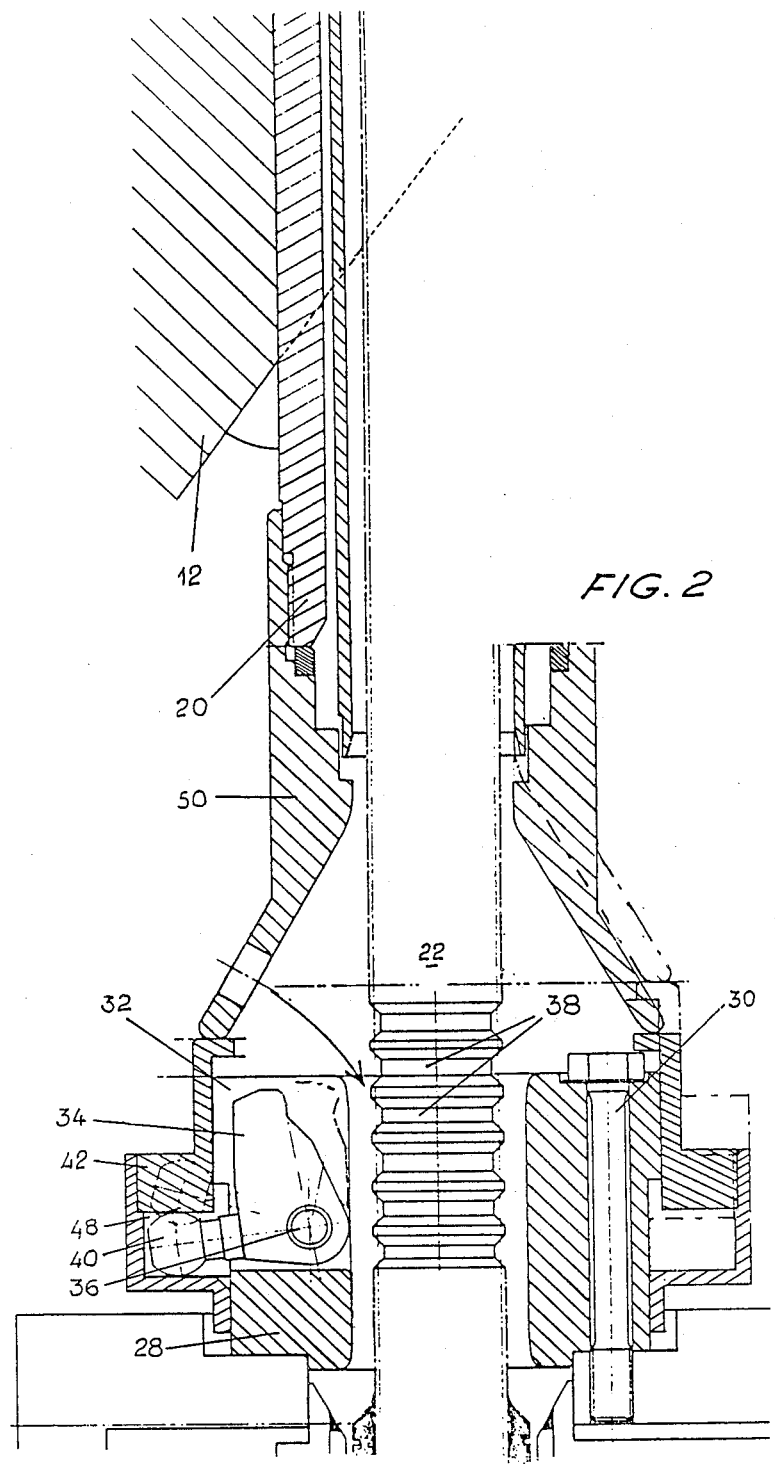
FIG. 2 is a view in elevation and in partial section through a vertical plane passing through the axis of a drive shaft, the parts being shown in the positions they assume when the cover is in place on the vessel.
Figure 3:
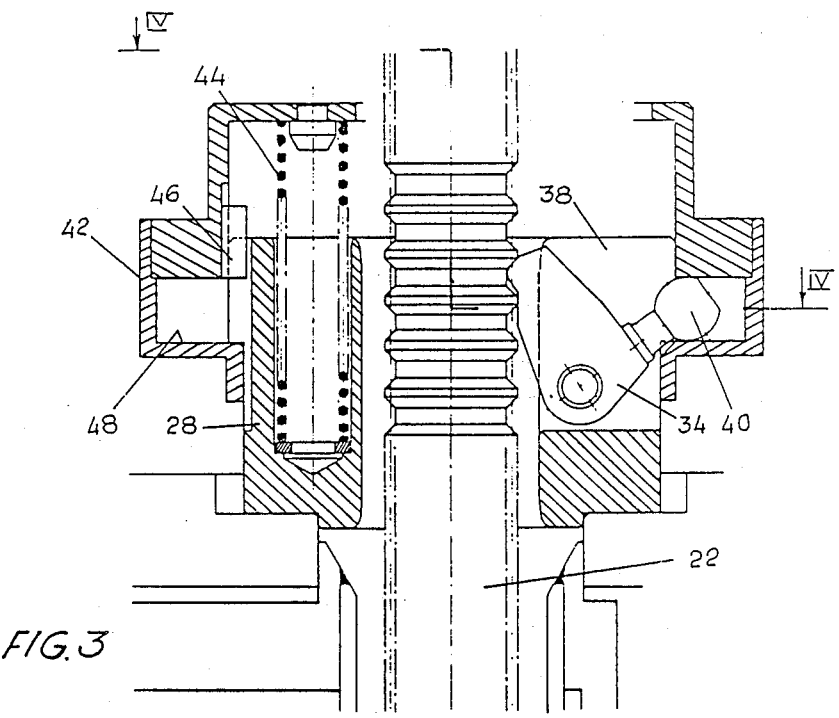
FIG. 3, similar to part of FIG. 2, is a view in section along line III—III of FIG. 4, illustrating the parts as they are when the cover has been removed.
Figure 4:
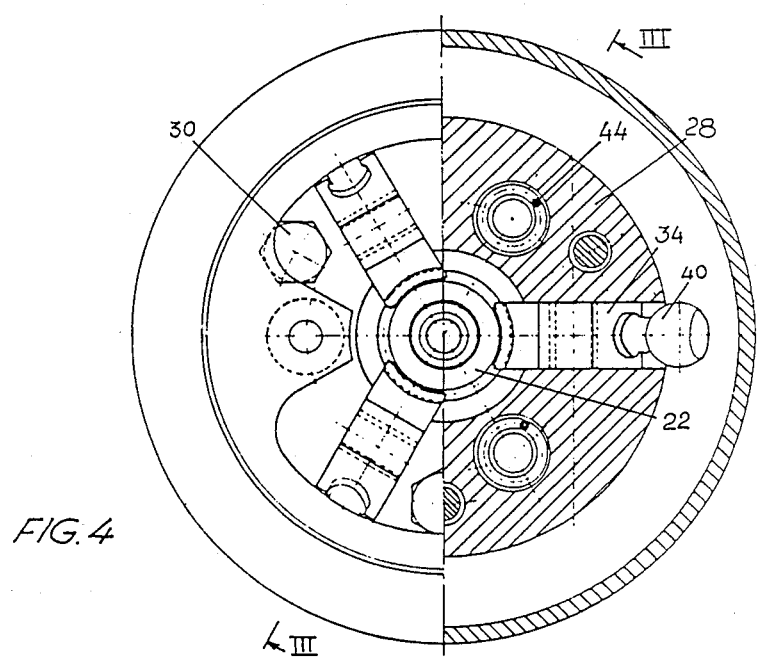
FIG. 4 is a view in transverse section taken along line IV—IV of FIG. 3.

Each of the guide tubes 18 is provided with a retaining device (situated in the zone designated by a dash-dot circle in FIG. 1) which will now be described with reference to FIGS. 2 to 4.

The retaining device comprises a base member 28 securely connected by suitable means, for instance bolts 30, to the upper part of each guide tube 18 which slidably receives a drive shaft 22. The base member is formed with three recesses 32 mutually spaced apart by 120° about the axis of the drive shaft. A horizontal pin 36 is located across each recess and a gripper 34 is pivotally received on the pin for pivotal movement in a plane passing through the axis of the guide tube 18. Each gripper is formed as a bell crank lever. One of the arms of the lever has a latching lip engageable in any one of the peripheral grooves 38 formed in shaft 22. The other arm has a terminal ball 40.

A slide member 42, consisting of a plurality of parts secured together, is mounted on base member 28 for vertical sliding movement thereon. Referring to FIG. 3, keying means 46 are provided for preventing rotation of the slide member about the shaft axis. The balls 40 of all three grippers are retained in an annular chamber 48 defined by the slide member. Three springs 44 compressed between the base member and the slide member exert on the slide an upwardly directed force which tends to urge the slide member to a higher position (FIG. 3). When the slide member is in that higher position, it retains the lips of the grippers 34 in engagement with a groove 38 of shaft 22.

Referring again to FIG. 2, a tulip shaped end piece 50 is permanently connected to the lower end of sleeve 20 and has a heat protection function. A calibrated hole in the tulip is formed for circulating a predetermined flow rate within the gap between the drive shaft and the guide tube. Flow calibration is important when there is a large number of clusters, since the cumulated flows short-circuit the core and may affect the overall thermal balance. During operation of the reactor, sleeve 20 and its end piece 50, as well as all upper internals, are immersed in the high temperature high pressure coolant, which also contacts the vessel wall. End piece 50 is secured in a position so selected that, whatever the differential thermal expansion between the parts, the end piece forcibly maintains slide member 42 in a position in which the grippers 34 are out of contact with shaft 22. In FIG. 2, the two endmost positions that gripper 34 may assume when the cover is in position are indicated. The position farthest from the shaft is indicated in full line. The dash-dot line indicates the position closest to the shaft that may be taken by gripper 34 when the cover is in position. It will be appreciated that there still exists an angular clearance of about 20° in the latter case, where the differential expansions are the most unfavorable.

On the other hand, springs 44 always engage the grippers 34 into the confronting groove 38 when the slide member 42 is free to move upwardly.

The device which has just been described may be operated as follows for reactor refueling.

First, the reactor is shut down. Then, the coolant temperature steadily decreases. When the temperature has become lower than 90° C., typically about 70° C., the cover is removed. The control clusters are then in lower position in the reactor. When the cover is lifted, the end pieces release the slide members 42. The slide members move up under the action of the return springs 44 and they apply the grippers 34 on the drive shafts 22.

Each drive shaft 22 in turn is then separated from the corresponding cluster. Typically, each drive shaft has a flexible finger grab for gripping a handling enlarged head of the cluster, such a construction being described, for instance, in French Pat. No. 2,537,764. Then separation may be carried out with a tool which is axially inserted into the drive shaft.

Figure 5:
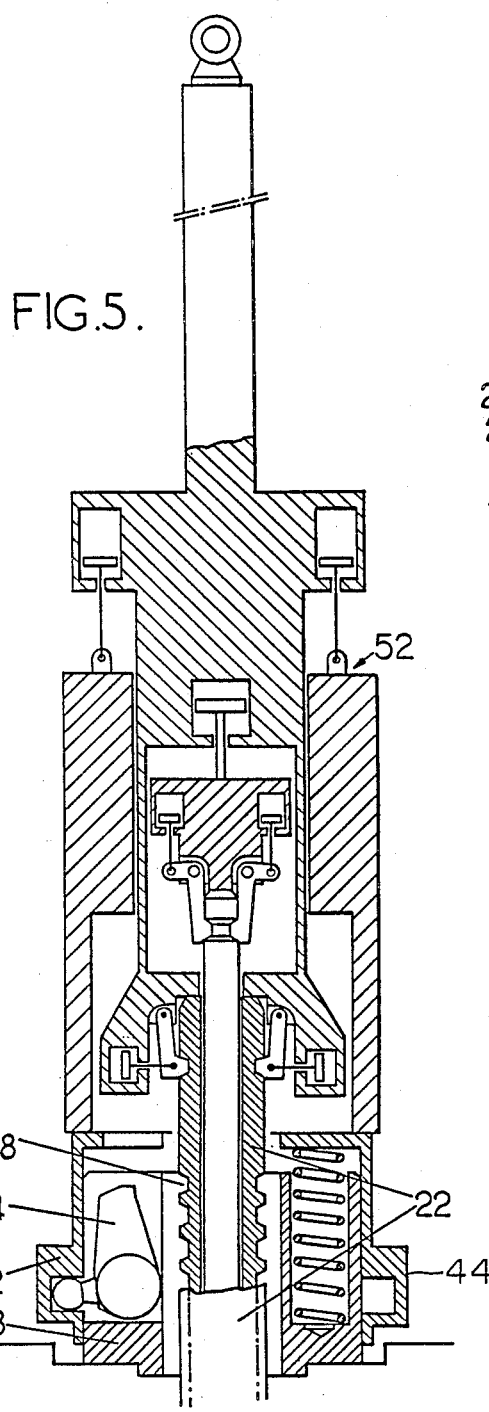
FIG. 5 is a diagrammatic view of a tool for locking a drive shaft in the upper internals of a reactor.

After the cluster has been released, each drive shaft is locked in the upper internals in a predetermined position, so selected that the lower end of the drive shaft be within the upper internals and there is no danger that the drive shaft later jams against the corresponding enlarged head, when the internals are inserted again into the reactor vessel. Referring to FIG. 5, each drive shaft is unlocked using a tubular tool whose lower end is shaped to force down the drive member 42 for spreading apart the grippers 34 and releasing shaft 22. The driving rod of tool 52 makes it possible to lift the drive shaft up to the predetermined locking level while the drive member 34 remains forced down. Last, the slide member 42 is released by lifting the lower end of the tool while the tool rod remains stationary. Then, the return springs 44 move back the slide member to its upper position and engage the grippers 34 in a groove 38 of the drive shaft 22. Then the tool may be removed.

The tool may be provided with a graduated scale for checking the level at which the drive shaft was locked.

After all drive shafts have been brought to the preselected locking position, the upper internals are removed as a whole and reloading may be carried out. After reloading has been completed, the upper internals are reinserted back. Then the drive shafts are moved down into engagement with the enlarged ends of the clusters. That operation may be carried with a tool (not shown) which is also arranged for unlocking the locking device by forcing down the slide member.

It will be appreciated that the device of the invention provides for safe locking of the drive shafts, whether or not they are attached to their clusters, at such a level that the handling steps and the abutment when the upper internals are inserted back are rendered easier. The time spent for connection, disconnection and associated check-up are reduced while safety is improved over that of the prior art devices.

What is claimed is:

1. In a nuclear reactor having a pressure vessel, a cover for said vessel, a sleeve (20) secured to the cover and projecting therethrough, upper internals insertable into and movable from said vessel, having a guide tube (18) in alignment with said sleeve, a drive shaft (22) formed with circumferential grooves and linearly movable along said guide tube, and a control cluster connectable by means of a remotely controlled tool to a lower end of said drive shaft, a device for retaining said drive shaft in locked condition within said upper internals, said device comprising (a) a base member (28) fixedly secured to an upper portion of said upper internals;
   (b) a plurality of spaced apart grippers (34) distributed about the axis of said base member (28) and each mounted about a pin carried by said base member for pivotal movement about a horizontal axis between a position of engagement with said drive shaft and a released position free from engagement with said drive shaft;
   (c) slide means (42) axially movable with respect to said base member between a higher position and a lower position, said slide means having a mechanical interconnection with said grippers such as to cause pivotal movement of said grippers into engagement with one of the grooves of said drive shaft when moved to said upper position; and
   (d) resilient means (44) arranged to exert an upwardly directed force on said slide means tending to engage said grippers into said shaft;
   (e) wherein said slide means is so dimensioned with respect to said base member as to be held by said sleeve at a position sufficiently remote from said upper position for maintaining the grippers out of engagement whatever the temperature prevailing in the reactor and consequently whatever the variations of relative position of the sleeve and the upper internals due to differential thermal expansion.

2. The device of claim 8, wherein said resilient means comprise three springs compressed between the base member and the slide means, distributed about the axis.

3. The device of claim 2, wherein said springs are circumferentially distributed about said axis and alternating with said grippers.

4. The device of claim 8, wherein each of said grippers is in the form of a bell crank lever having one arm formed with at least one latching tooth and another arm having a terminal ball emprisoned in the slide means.

5. The device of claim 8, wherein each of said sleeves is provided with a tulip shaped end piece arranged for engaging said slide means and which constitutes heat protection means.

* * * * *